United States Patent [19]

Holmberg

[11] Patent Number: 4,929,948
[45] Date of Patent: May 29, 1990

[54] PORTABLE DATA SYSTEM

[75] Inventor: Göran I. Holmberg, Boca Raton, Fla.

[73] Assignee: Basics Corporation, Boca Raton, Fla.

[21] Appl. No.: 321,241

[22] Filed: Mar. 9, 1989

[51] Int. Cl.⁵ .......................... G08B 1/00; G06F 1/00
[52] U.S. Cl. ................................. 340/407; 364/708; 190/110; 400/251
[58] Field of Search ............... 340/407; 364/708; 190/16, 18 R, 100, 102, 109, 110; 206/278; 400/251; 361/331, 342

[56] References Cited

FOREIGN PATENT DOCUMENTS

| 159920 | 8/1985 | Japan | 364/708 |
| 160418 | 8/1985 | Japan | 364/708 |
| 189525 | 9/1985 | Japan | 364/708 |

Primary Examiner—Donnie L. Crosland
Attorney, Agent, or Firm—Sughrue, Mion, Zinn, Macpeak & Seas

[57] ABSTRACT

A transportable data system includes two units (3, 4) which are fitted in a rigid case which includes a lid (2) and a bottom part. When the lid is closed, the one unit (3), which is supported by a carrier plate, is located above the other unit (4), whereas when the case is open, with the lid substantially vertical, the one unit can be moved towards and partially into the lid, so as expose the other unit (4) and bring it to a working position. Provided are two separate side - walls (14, 15) which are fitted firmly to the bottom part (1), and each of which has an upper guide rail (6, 7). The guide rails are parallel with the bottom part and also with one another. Furthermore, the carrier plate (5) is displaceably mounted on the guide rails.

2 Claims, 1 Drawing Sheet

PORTABLE DATA SYSTEM

BACKGROUND ART

The present invention relates to a portable data system which comprises at least two separate co-operating units, for instance a PC-computer and a printer, said system being provided in a rigid case which includes a lid and a bottom and wherein when the case is closed the one unit, which is supported by a displaceable carrier plate, is located above the other unit and, when the case is open with the lid substantially vertical, can be displaced towards and partially into the lid, therewith exposing the other unit so that said other unit is brought into a working position. A data system of this general kind is described and illustrated in our co-pending U.S. patent application Ser. No. 203,852 filed June 7 1988.

Such "brief-case size" computer systems have been found a useful instrument in aircraft, hotel rooms, etc.. In our earlier system, the carrier plate is mounted with the aid of two parallel-arm mechanisms located on each side of the computer on the case bottom. It is difficult to make such parallel-arm mechanisms completely rigid in the lateral direction, however, and such mechanisms are also expensive to produce. Consequently an object of the present invention is to provide a simple and rigid arrangement which will enable two system units, e.g. a personal computer and a printer connected thereto, to be transported one on top of the other, and which can be adapted readily to units of mutually different size.

DETAILED DESCRIPTION OF THE DRAWING

Figure 1:
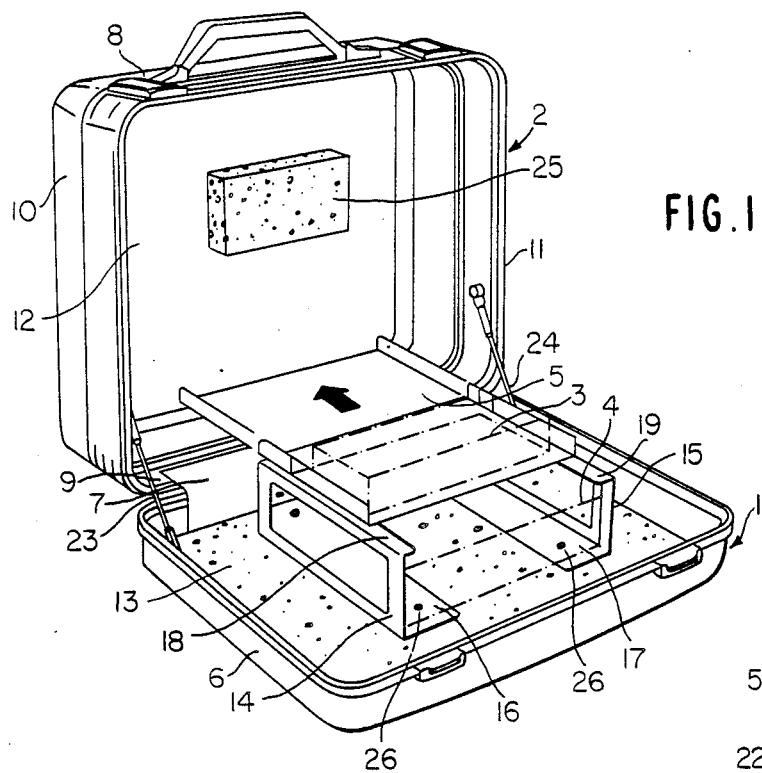
FIG. 1 is a perspective view of an open brief case provided with an arrangement according to the invention.

FIG. 1 illustrates the inventive system in its working state. The system includes a case which comprises a rectangular bottom part 1 having a shallow circumferential lip 6, and a lid 2 which is hinged to the bottom part 1 by a hinge 7. The lid has a front wall 8, a back wall 9, two side walls 10, 11, and a top wall 12. The walls have mutually the same height and define a space which accommodates a data unit 4, which may either be loose or firmly attached to the bottom part, said bottom part being essentially flat. In order to reduce the effect of impact on the case, for instance, the bottom part 1 of the case is provided with a layer 13 of foam rubber or foamed plastic. The aforesaid unit 4 may comprise a personal computer (PC), a printer, or like apparatus and is preferably firmly attached to the bottom part 1 and can be provided with a raisable and lowerable picture screen.

As shown in FIG. 1 the unit has located on both sides thereof side-wall elements 14, 15 each of which has a respective flat bottom flange 16 and 17 from which there extend upstanding, rectangular side-wall frames, the upper, straight and mutually parallel edges of which merge with guide rails 18, 19 which face towards each other. The guide rails are preferably made of metal, as is also the remainder of the alternative side-wall elements. In the embodiment illustrated in FIG. 2, the guide rails 20 are U-rails and are made of metal or a plastic material. The rails are secured to respective vertical side-wall elements 14 and 15 by means of an adhesive, rivets or the like. FIG. 3 shows the right hand guide rail 19 of the FIG. 1 embodiment. A carrier plate 5 is slideably mounted on the side-wall elements 14, 15, or more specifically on the guide rails 18, 19, 20.

Figure 2:
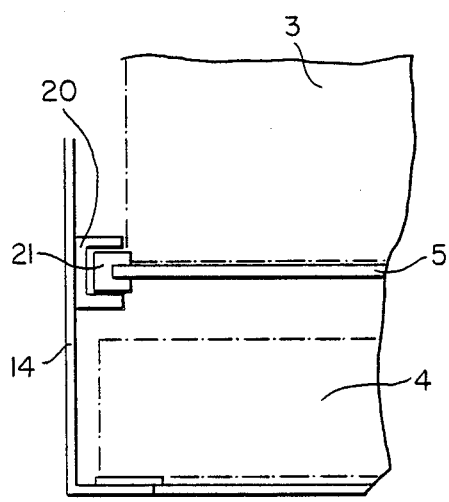
FIG. 2 is a simplified illustration of one embodiment of a slide rail and shows one edge of the carrier plate.
Figure 3:
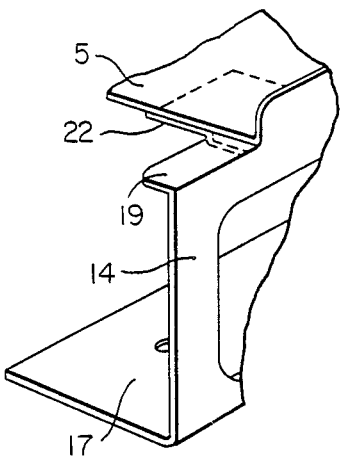
FIG. 3 illustrates a modified embodiment of the slide rail and carrier plate.

Mounted on the mutually parallel, straight edges of the carrier plate 5 of the FIG. 2 embodiment, which edges face towards the side-wall elements 14, 15, is a strip 21 which has a straight groove or slot into which one edge of the carrier plate is pressed. The strip 21 is, in turn, inserted into the inner channel of the guide rail 20 and the carrier plate 5 can therewith be displaced in the longitudinal direction of the guide rails between the two positions shown in FIG. 1.

FIG. 3 shows the guide rail 19 of FIG. 1 and the edge part of the carrier plate 5 co-acting with said rail. This edge part of the plate has provided on the under surface thereof a slide plate 22 which extends beneath the rail 19 and prevents the carrier plate from being lifted from the guide rails while permitting the carrier plate, and the data unit 3 mounted thereon, which may comprise a printer for example, to be displaced away from a position according to FIG. 1, in which the carrier plate and said unit are partially inserted into the lid 2, so that the lower unit 4 is exposed for work, as described in our patent application Ser. No. 203,852 filed June 7, 1988.

Pivot limiting struts or like devices 23 and 24 are mounted between the bottom part 1 and the lid 2, in a manner to hold the lid substantially vertical.

Adhesively bonded to the centre of the inner surface of the lid 2 is a foam plastic pad or cushion 25 which lies against the unit 3 so as to hold the two units firmly, but gently, during transportation of the case with the case closed.

By constructing the supporting side-wall elements 14 and 15 as separate parts it is possible to adjust the spacing between said elements so as to accommodate units of mutually different size. Naturally, the carrier plate 5 must also be adapted to the spacing between the side-wall elements, which are secured to the bottom parts 1 with rivets rivets 23. In addition to units of the aforesaid kind, the case may also be fitted with other auxiliary apparatus, such as a cellular telephone or a telecopier or the like. It is also conceivable to fit the case with high capacity NiCad battery packs, for driving the units.

I claim:

1. A transportable data system comprising at least two mutually cooperating units (3, 4), for instance a personal computer and a printer, said system being fitted in a rigid case which includes a lid (2) and a bottom part (1) and, in which system when the case is closed the one unit (3), which is supported by a displaceable carrier plate (5), is located above the other (4) of said units, and when the case is open, with the lid (2) substantially vertical, can be displaced towards and partially into the lid so as to expose the said other unit (4) so that said other unit will come into a working position, characterised in that firmly attached to the bottom part of the case (1) are two separate side-wall elements (14, 15) each of which has an upper guide rail (18, 19, 20) which is parallel with said bottom part, said guide rails being parallel with each other, and in that the carrier plate (5) is displaceably mounted on the guide rails 18, 19, 20 with the aid of guide means (21, 22).

2. A transportable data system according to claim 1, characterised in that the two mutually separate end-wall elements are riveted to the bottom part (1).

* * * * *